United States Patent
Gauger et al.

(10) Patent No.: US 6,195,603 B1
(45) Date of Patent: Feb. 27, 2001

(54) MULTIPLE SPEED VEHICLE SEAT MEMORY CONTROL APPARATUS

(75) Inventors: Derek K. Gauger, Ann Arbor; Richard W. A. Rees, Auburn Hills, both of MI (US)

(73) Assignee: Lear Corporation, Southfield, MI (US)

( * ) Notice: Subject to any disclaimer, the term of this patent is extended or adjusted under 35 U.S.C. 154(b) by 731 days.

(21) Appl. No.: 08/514,180

(22) Filed: Aug. 11, 1995

(51) Int. Cl.$^7$ .................................. B60N 2/02; H02P 3/00; H02P 7/00
(52) U.S. Cl. .................. 701/49; 296/68.1; 318/466
(58) Field of Search ............... 364/424.059; 318/466, 318/568.1; 296/65.1; 307/10.1

(56) References Cited

U.S. PATENT DOCUMENTS

| | | | |
|---|---|---|---|
| 4,204,255 | 5/1980 | Cremer | 364/424.05 |
| 4,404,632 | 9/1983 | Harada et al. | 364/424.05 |
| 4,434,468 | 2/1984 | Caddick et al. | 364/424.05 |
| 4,451,887 | 5/1984 | Harada et al. | 364/424.05 |
| 4,463,426 | 7/1984 | Caddick et al. | 364/424.05 |
| 4,503,504 | 3/1985 | Suzumura et al. | 364/424.05 |
| 4,689,537 | 8/1987 | Mizuta et al. | 318/568 |
| 4,698,571 | 10/1987 | Mizuta et al. | 318/568 |
| 4,706,194 | 11/1987 | Webb et al. | 364/424.05 |
| 4,728,873 | 3/1988 | Inoue et al. | 318/568 |
| 4,775,939 | 10/1988 | Nakashima et al. | 364/424.05 |
| 4,812,838 | 3/1989 | Tashiro et al. | 340/825.06 |
| 4,845,620 | 7/1989 | Parker | 364/424.05 |
| 4,853,687 | 8/1989 | Isomura et al. | 340/825.3 |
| 4,907,153 | 3/1990 | Brodsky | 364/424.05 |
| 4,922,426 | 5/1990 | Obara et al. | 364/424.05 |
| 5,097,185 | * 3/1992 | Ogasawara | 318/268 |
| 5,164,645 | 11/1992 | Furuse et al. | 318/467 |
| 5,197,007 | 3/1993 | Parker | 364/424.05 |
| 5,283,473 | 2/1994 | Furuse et al. | 307/10.6 |
| 5,319,248 | 6/1994 | Endou | 307/10.1 |
| 5,497,326 | * 3/1996 | Berland et al. | 364/424.05 |

* cited by examiner

*Primary Examiner*—Michael J. Zanelli
(74) *Attorney, Agent, or Firm*—MacMillan, Sobanski & Todd, LLC (57) ABSTRACT

A vehicle seat memory control apparatus includes motor driven adjustment mechanisms for various seat component adjustments for movement of various seat adjustments to a predefined easy entry seat position and movement of the seat from the easy entry position back to the last user selected displacement position of the seat component adjustments. Each motor drive provides multiple speeds of output shaft rotation, a higher speed selected by a controller for movement to the easy entry position and a lower speed for user selected seat adjustments and for movement from the easy entry seat position back to the last user selected seat displacement position. End of travel limits are provided for each seat component adjustment. The controller continually compares the current displacement position of each seat component adjustment with the respective end of travel limits to deactivate a drive motor when any end of travel limit is reached by a seat component adjustment.

13 Claims, 5 Drawing Sheets

MULTIPLE SPEED VEHICLE SEAT MEMORY CONTROL APPARATUS

BACKGROUND OF THE INVENTION

1. Field of the Invention

The present invention relates, in general, to vehicle power seat adjusters and, more specifically, to memory systems for vehicle power seat adjusters which reposition the seat to a stored memory position.

2. Background Art

Power seat adjusters are a popular option on many automotive vehicles and are frequently offered as standard equipment on higher priced vehicles. Such power seat adjusters are primarily used on the driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slidably mounted on a lower track anchored to the vehicle floor. A drive mechanism typically includes a bi-directional electric motor which rotates a pair of drive shafts extending outward from the motor to a gear assembly or box mounted on each upper track. In one arrangement, each gear box rotates a lead screw extending longitudinally below each upper track. A drive block is fixedly mounted to each lower track and threadingly receives the lead screw to cause reciprocal, horizontal movement of the upper track and the attached seat support frame upon selective energization of the drive motor and the drive shafts.

Similar drive mechanisms are provided for vertical (up and down) adjustment of the seat support frame and, in a seat adjuster having a seat recliner adjustment mechanism, for angularly adjusting the position of the seat back with respect to the seat bottom. The vertical drive mechanism may include separate front and rear edge seat adjustment drive mechanisms for selectively tilting the front and rear edges of the seat bottom independent of each other as well as simultaneously to raise and lower the entire vehicle seat or, in some applications, only the seat bottom or cushion.

Each vertical and recliner drive mechanism also includes a drive motor having a rotatable output shaft connected to a gear assembly either directly in the case of the front and rear vertical drive mechanisms or by means of two shafts extending from a single motor to separate gear assemblies mounted on each upper track or on the seat support frame in the case of a seat recliner drive mechanism.

Control for each drive motor is provided by a manually operable, two position, center neutral switch which is activated by a user and held in one position to supply current to the selected drive motor to rotate the output shaft of the motor in the desired direction to effect repositioning of either the horizontal, vertical and/or seat recliner drive mechanisms of the seat.

It is also known to provide the driver and/or passenger seat with memory capability to automatically move the seat adjuster to one of one or more memory or recall positions which are preset by an occupant. Such seat adjusters with memory control capability have also included a so-called "easy entry" position in which the seat adjuster, upon activation of pushbutton, is moved to a position permitting easy ingress and egress to and from the seat.

In such power seat adjusters, the seat is repositioned under user control or automatically to a recall memory position, or to or from an "easy entry" position at the same, single speed. While such a single speed is acceptable for manual operation of the seat which generally requires only small incremental movements, the generally slow speed of the drive motor for memory seat position recall or movement to or from the "easy entry" position is unsatisfactory due to the length of time required for the seat adjuster to reach the "easy entry" position or to return to the memory position when the driver or passenger is ready to enter or leave the vehicle.

Thus, it would be desirable to provide a vehicle power seat adjuster with last seat position memory recall and an easy entry position permitting easy ingress and egress to and from the seat which overcomes the deficiencies of previous devices memory control seat adjusters. It would also be desirable to provide a vehicle power seat adjuster with memory position recall and an easy entry memory position in which the drive motor(s) are capable of multiple speed operation for use in quickly repositioning the seat adjuster to and/or from the "easy entry" position.

SUMMARY OF THE INVENTION

The present invention is a multiple speed vehicle seat memory control apparatus which uniquely provides user actuated automatic movement of at least one and/or a plurality of seat adjustments from a last seat adjustment displacement position to a predefined easy entry position for easy ingress and egress of a passenger to and from the seat.

The apparatus includes a motor and drive mechanism operative to position a first seat component relative to a second seat component. Means are connected to the motor for generating a first seat component displacement signal indicative of the position of the first seat component relative to the second seat component. Memory means store the first seat component displacement signal and a preset easy entry displacement position of the first seat component. Easy entry select means are provided for selecting the easy entry displacement position of the first seat component. Recall select means are provided for selecting the last displacement position of the first seat component. A control means is connected to the memory and is responsive to the easy entry select means and the recall select means for respectively repositioning the first seat component to the predefined easy entry position and back to the last displacement position upon respective activation of the easy entry select means and the recall select means.

In an exemplary embodiment, the drive motor of the power seat adjuster has a bidirectionally movable output member, such as a rotatable shaft. Further, each drive motor includes means for generating at least two distinct speeds of rotation of the output member or shaft, the higher speeds being employed for movement to the easy entry position and the lower speed being employed for user selected seat adjustments and possibly automatic movement of the seat from the easy entry position to the last displacement seat adjuster position.

Preset first and second end of travel limits for each controlled seat adjustment component with respect to a corresponding second seat component are also stored in the memory. The end of travel limits are compared by the control means with the current displacement position of each seat component during movement of the seat component to enable the controller to deactivate the drive motor when the seat adjustment component controlled by the drive motor reaches one of the preset end of travel limits.

The apparatus of the present invention uniquely provides a high speed movement of a power seat adjuster from a last user selected seat adjuster displacement position to a preset easy entry position which permits easy ingress and egress of a passenger to and from the seat. In this manner, the easy entry position is achieved in the quickest possible time for enhanced user convenience.

Further, the preset end of travel limits stored in the memory and utilized by the controller to deactivate any motor drive when the particular seat adjustable component reaches one of the predefined end of travel limits eliminates the high strength hard structural stop required in previously devised power seat adjusters to limit extreme movement of each seat adjustment component between extreme ends of travel. This also eliminates the abrupt stop of the seat adjuster during such movements which is disruptive or a nuisance to a seat occupant. At the same time, the preset end of travel limits which enable the controller to automatically deactivate any seat adjustment component when the component reaches one of the end of travel limits enables the power seat adjuster of the present invention to be designed with end stops which have a lower structural strength and thereby a lower cost since the seat adjustment component does not have to be brought to a stop solely by the end stop.

Finally, the control means and the memory means are compactly mounted as an integral part of the drive motor having the "easy entry" feature. This simplifies and reduces the cost of providing an "easy entry" feature in a vehicle power seat adjuster since only the drive motor or motors having the "easy entry" feature are provided with a control and memory means. This also eliminates the need for a single large housing for a control and memory means used for all of the drive motors on a power seat adjuster thereby reducing space requirements in the already confined space beneath a power seat adjuster.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 1:
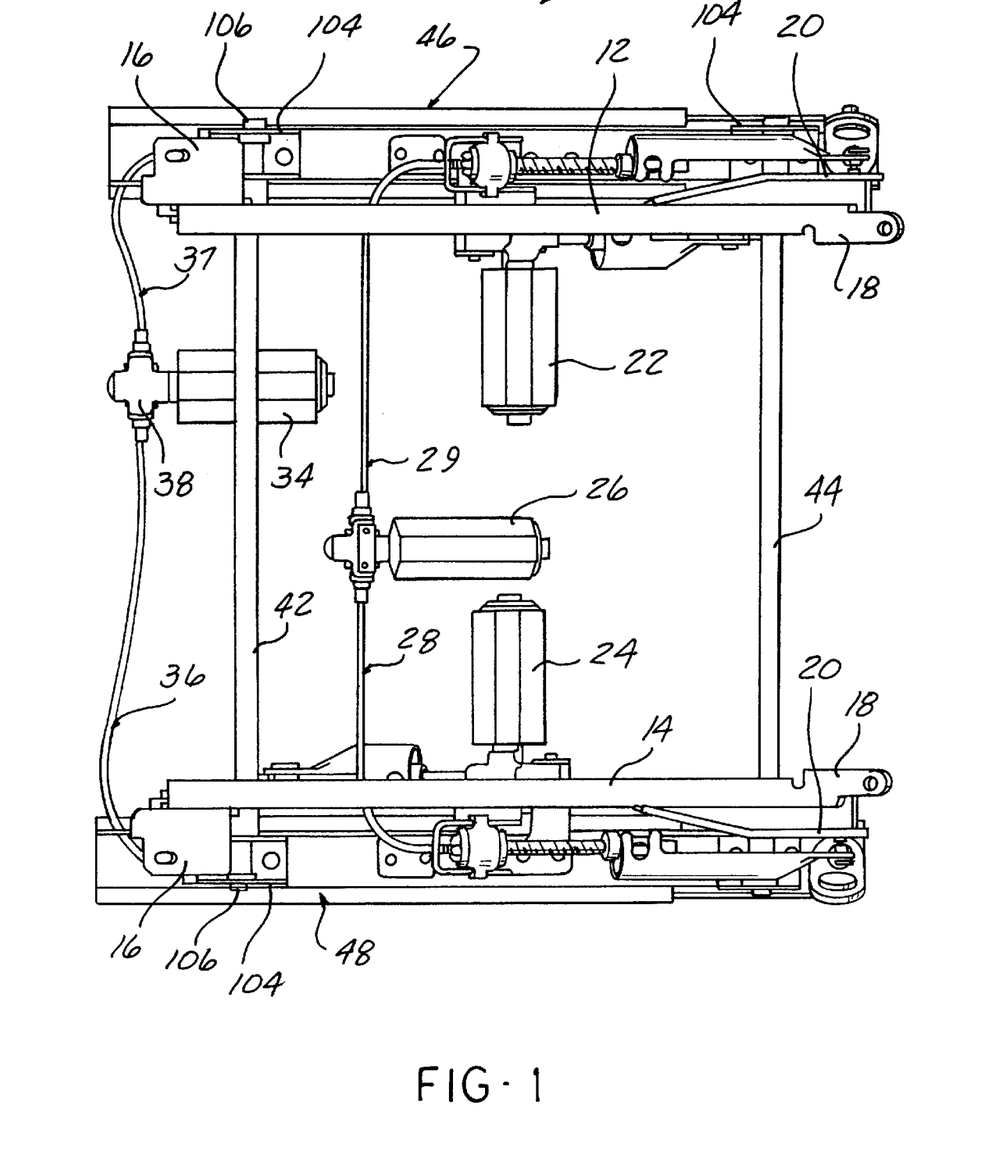
FIG. 1 is a plan view of a conventional vehicle power seat adjuster incorporating the memory control apparatus of the present invention.
Figures 2, 3:
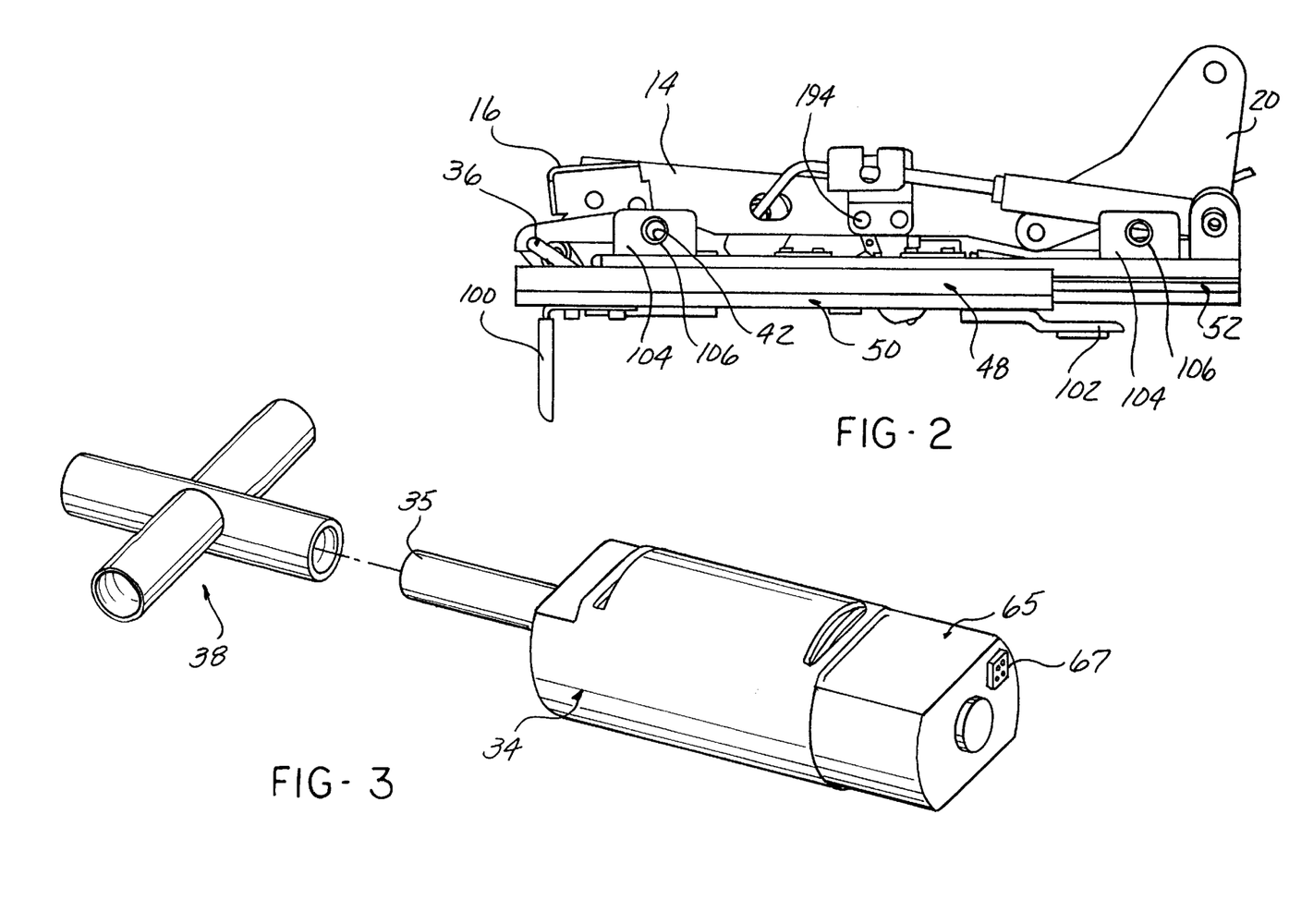
FIG. 2 is a side elevational view of the power seat adjuster shown in FIG. 1.
FIG. 3 is an enlarged, perspective view of one of the drive motors of the power seat adjuster shown in FIG. 1 having a control apparatus according to the present invention mounted thereon.

Referring now to the drawing, and to FIGS. 1 and 2 in particular, there is illustrated a power seat adjuster 10 which variably positions an automotive vehicle seat to any occupant selected position. The power seat adjuster 10 is a so-called "eight-way" adjuster providing horizontal fore/aft, vertical up and down, independent movement of each of the front and rear edges of the seat adjuster as well as pivotal tilting of the seat back with respect to the seat bottom. It will be understood, however, that the present invention described hereafter is employable with a power seat adjuster which includes at least one of such movements or adjustments, such as a horizontal fore/aft movement by itself or in combination with any number of the other such movements described above, each of which can also be used separately.

As is conventional, the power seat adjuster 10 supports a conventional vehicle seat, not shown, which includes a seat bottom or cushion and a seat back. An upper seat support frame is provided on the power seat adjuster 10 for supporting and connecting the seat bottom and the seat back to the power seat adjuster 10. The upper seat support frame includes a pair of spaced, longitudinally extending frame members or rails 12 and 14. Mounting brackets 16 are mounted on the front end and a mounting surface 18 is formed at the rear end of the frame members 12 and 14 for connecting the seat bottom to the upper support frame. It will be understood that in lieu of the seat support frame members 12 and 14, suitable mounting brackets may be provided on the power seat adjuster 10 for direct attachment of a seat bottom of a vehicle seat to the power seat adjuster 10. A seat back pivot bracket 20 is mounted on each of the seat support frame members 12 and 14 to provide a pivot connection to the seat back, not shown, and to permit selective tilting or pivotal movement of the seat back with respect to the seat bottom as is typical in so-called "seat recliners".

Various drive assemblies are mounted on the power seat adjuster 10 to provide selective movement of various components of the power seat adjuster along various axes. For example, front and rear vertical drive motors 22 and 24, respectively, are mounted on the power seat adjuster 10 and connected to conventional lead screws and drive blocks or nuts to independently elevate front and rear edges of the seat support frame members 12 and 14, respectively, to thereby provide selective vertical adjustment of the front and rear edges of the vehicle seat. In addition, a seat back recliner drive motor 26 drives a pair of rotatable drive shafts 28 and 29 which are coupled to individual lead screws. Each lead screw is connected by a drive link to one of the seat back pivot brackets 20 mounted on opposite sides of the power seat adjuster 10 to provide selective pivotal adjustment of the seat back with respect to the seat bottom of a vehicle seat mounted on the seat support frame members 12 and 14.

The power seat adjuster 10 also includes a horizontal drive means formed of an electric motor 34 which is fixedly mounted to one of the upper tracks of the power seat adjuster 10 by means of a suitable bracket, not shown. A pair of bi-directionally rotatable drive shafts 36 and 37 extend outward from a gear assembly or box 38 integrally connected to the output shaft of the drive motor 34 to a rotatable connection with a lead screw disposed in each of a pair of opposed track assemblies as described hereafter.

The power seat adjuster 10 also optionally includes front and rear tubular torsion tubes or rods 42 and 44, respectively, which extend between and are connected to opposed track assemblies denoted generally by reference numbers 46 and 48 to provide a rigid support structure for the power seat adjuster 10.

As each of the track assemblies 46 and 48 is identically constructed, the following description will be provided only for track assembly 48. It will be understood that the opposite track assembly 46 is constructed in the same manner.

As shown in FIG. 2, the track assembly 48 includes a lower track 50 and an upper track 52. The upper track 52 is slidably disposed within the lower track 50 and is bi-directionally movable along the lower track 50 under the control of the horizontal drive means.

In order to stationarily affix the power seat adjuster 10 to the vehicle, such as to the floor of the vehicle, a front riser 100, shown in FIG. 2 and a rear riser 102 are attached to each lower track 50 at opposite ends thereof. The front riser 100 and the rear riser 102 provide a mounting connection to the vehicle floor by means of bolts or other suitable fasteners or anchors, not shown.

Further, as shown in FIGS. 1 and 2, each torsion tube 42 and 44 is rotatably mounted in suitable mounting brackets denoted generally by reference number 104 which are fixed to opposite ends of each upper track 52. A fastener 106, such as a conventional push nut, is mounted on the outer end of each torsion tube 42 and 44 to securely retain each torsion tube 42 and 44 in the associated mounting bracket 104.

As described above, the electric horizontal drive motor 34 is mounted by a suitable bracket or other mounting members to the upper tracks 52 of the power seat adjuster 10 and is typically located between the track assemblies 46 and 48 as shown in FIG. 1. The motor 34 has a rotatable output shaft 35, shown in FIG. 3, which rotates in either of two directions depending upon the selective mode of energization of the motor 34. The gear means 38 in the form of a gear box or gear assembly is integrally formed as part of the motor 34 and is connected to the output shaft of the motor 34. The gear means 38 functions to convert rotation of the output shaft 35 of the motor 34 to rotation of the two horizontal drive shafts 36 and 37. The gear means 38 may also be mounted separate from the motor 34 while still being coupled to the output shaft 35 of the motor 34. A suitable gear reduction may be implemented by the gear means 38 so as to provide a low speed of rotation with high torque to the drive shafts 36 and 37.

Instead of a motor having a rotatable output shaft, the horizontal, vertical and/or recliner drive mechanisms may use a motor driven linear actuator which translates an output shaft in either direction.

According to the present invention, a power seat adjuster control system is provided for automatic repositioning of the seat between a "easy entry" position and a recall memory position, preferably at a faster motor speed than the speed of rotation of the motor 34 output shaft in repositioning the various components of the seat, such as the horizontal drive mechanism, under user control.

Figure 4:
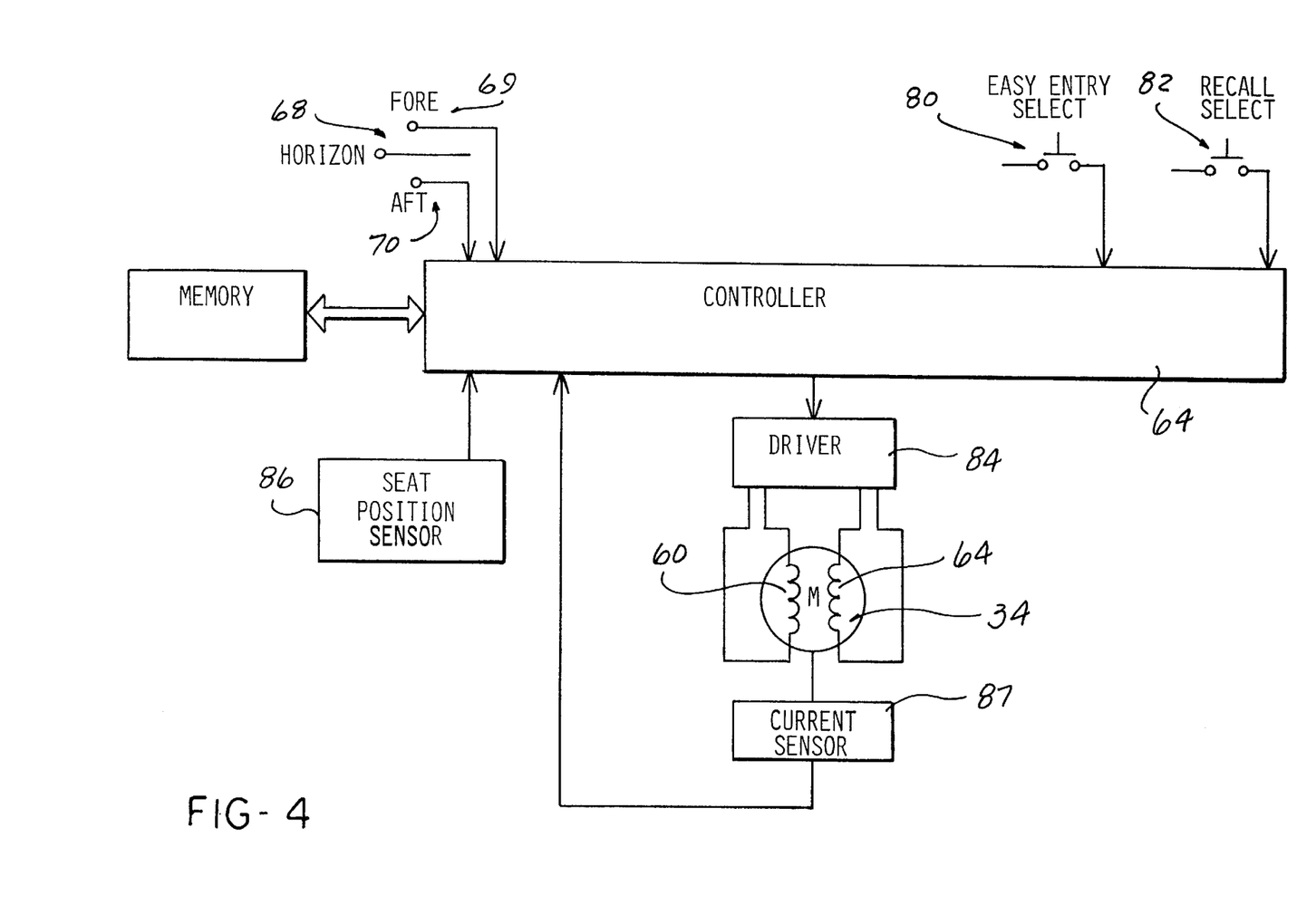
FIG. 4 is an exemplary schematic diagram of the power seat adjuster according to the present invention.

The control system of the present invention includes means for providing selectible multiple speeds of rotation of a motor output shaft, such as the output shaft of the fore/aft horizontal drive motor 34, which is provided, by example, with two separate windings 60 and 62 shown in FIG. 4 which can be controlled by one or two commutators. The first winding 60 is the conventional winding found in a drive motor for a power seat adjuster and is labeled "lo" speed. The second winding 62 labeled "hi" provides a higher or faster speed of rotation of the motor 34 output shaft. Alternately, a single winding may be utilized in the motor 34 and supplied with two different voltages to obtain two different output shaft rotation speeds.

The control system includes a controller 64 preferably in the form of a microprocessor which executes a control program stored in a memory 66. The memory 66 may be any conventional type of memory used with a microprocessor and may include both RAM and ROM memory elements.

As described hereafter, a separate controller 64 is mounted on each motor 22, 24, 26 and 34 and controls a separate seat adjustment operation. However, a single controller 64 can also be utilized for all of the drive motors on a seat adjuster.

Input to the controller 64 is a two position horizontal fore and horizontal aft switch 68 with separate fore and aft outputs 69 and 70, respectively. Similar switches, not shown, are used for controllers associated with the vertical and seat recliner drive motors.

An "easy entry" user select means 80, preferably in the form of a pushbutton or switch, is also input to the controller 64. Alternately, a signal from a conventional remote vehicle door opener can also be input to the controller 64 as a "easy entry" user select signal. A recall user select means 82, also in the form of a pushbutton or switch, is input to the controller 64.

The controller 64 provides an output to a driver 84 connected to the motor 34. The driver 84 includes circuitry for converting output signals from the controller 64 to control the flow of current in either of two directions through either of the windings 60 and 62 to select one of the windings 60 and 62 as well as the direction of rotation of the motor 34 output shaft.

Displacement position means provide an output signal indicating the position of one seat adjustment element. For example, a sensor means 86 is mounted on the motor 34 and is responsive to the motor output shaft rotation. The sensor means 86 may take the form of any conventional sensor which provides output pulses in response to rotation of a portion of a seat adjuster component, such as rotation of the motor 34 output shaft. By way of example only, the sensor means 86 may be in the form of a Hall-effect device which is responsive to rotation of the motor 34 output shaft and generates at least one and possibly multiple pulses for each 360° rotation of the motor 34 output shaft. These output pulses or signals from the sensor means 86 are input to the controller 64. Alternately, the sensor means 86 may be a potentiometer which provides a varying voltage signal depending on the position of the upper track relative to the lower track.

The driver 84 may include conventional relays which are activated by control signals from the controller 64 to provide current to the windings 60 and 62 of the motor 34 as well as controlling the direction of current flow through each of the windings 60 and 62 in a known manner.

The output pulses from the sensor means 86 are utilized by the controller 64 to provide a count representative of the actual displacement position of the seat drive elements between extreme positions of travel, such as a full forward end of travel limit and a full rearward end of travel limit. The forward and rearward end travel limits are prestored in the memory 66 as counts, such as a "zero" count for the full forward end of travel limit and a count of "x" for the full rearward end of travel limit.

At the initial application of electrical power to the controller 64 and, possibly, after each disconnection and reconnection of the vehicle battery, it will be necessary to provide the controller 64 with a frame of reference for the position of the horizontal drive of the seat adjuster 10. This can be done by activating the motor 34 in one direction of output shaft rotation to move the horizontal drive elements to the full forward end of travel limit. With suitable control program instructions, the controller 64 will recognize this position as a "zero" count position. The motor 34 output shaft is then rotated in the opposite direction until the horizontal drive elements reach the full rearward end limit of travel. The count at this position equals the rearward end of travel limit.

Based on the accumulated count of output pulses from the sensor means 86 during movement of the horizontal drive of the seat adjuster 10 through rotation of the output shaft of the motor 34, the controller 64 has an indication of the exact position of the horizontal drive elements and therefore the horizontal fore and aft position of the seat with respect to a known reference, such as the zero count or the full forward end of travel limit.

The output pulses or counts from the sensor 86 are continually stored as an accumulated count by the controller 64 in the memory 66, as described in detail hereafter, to provide a known indication of the last or current horizontal position of the power seat adjuster.

As shown in FIG. 3, the controller 64, memory 66, driver 84 and the current sensor 87 are preferably contained in a housing 65 mounted on the motor 34. The seat position sensor 86 can also be mounted in the housing 65 or separate therefrom depending on the type of sensor 86 employed. The outputs of the horizontal fore/aft switch 68, the "easy entry" user select means or switch 80 and the recall select means or switch 82 are connected to the controller 64 in the housing 65 by individual conductors or via a cable or harness having a plug-in, type connector engagable with a mating connector 67 mounted on the housing 65. Further, the outputs from the switches 68, 80 and 82 can be multiplexed over a single conductor connected to the controller 64 via a switchable connector 67.

According to the present invention, the control apparatus includes an "easy entry" position which is a manufacturer set position which may vary depending upon the requirements of a particular application. For example, in both two-door vehicles without a useable backseat and four-door vehicles, the "easy entry" position of the vehicle driver's seat may be defined as a full rearward position of the seat. This provides a suitable seat position for easy ingress and egress of the driver into and out of the front seat. Alternately, in a two-door vehicle with a useable backseat, the "easy entry" position may be defined by the manufacturer as a full forward position of the seat. In this application, the seat back may also be provided with a manual release permitting manual pivoting of the seat back to a full forward position to further enable easy access to the rear seat vehicle.

In any defined "easy entry" position, additional controls may also be provided for the vertical drive and/or the recliner drive. In any "easy entry" position, the vertical drive may be moved to a full down position and the recliner to a central angular position or even a fully pivoted forward position.

Depending upon the application requirements, the "easy entry" position of the drive motor 34, and/or the drive motors 22, 24 and 26 of the power seat adjuster are prestored in the memory 66 of each controller along with the first and second end of travel limits for each of the drive motors 34, 22, 24 and 26.

Figure 5A:
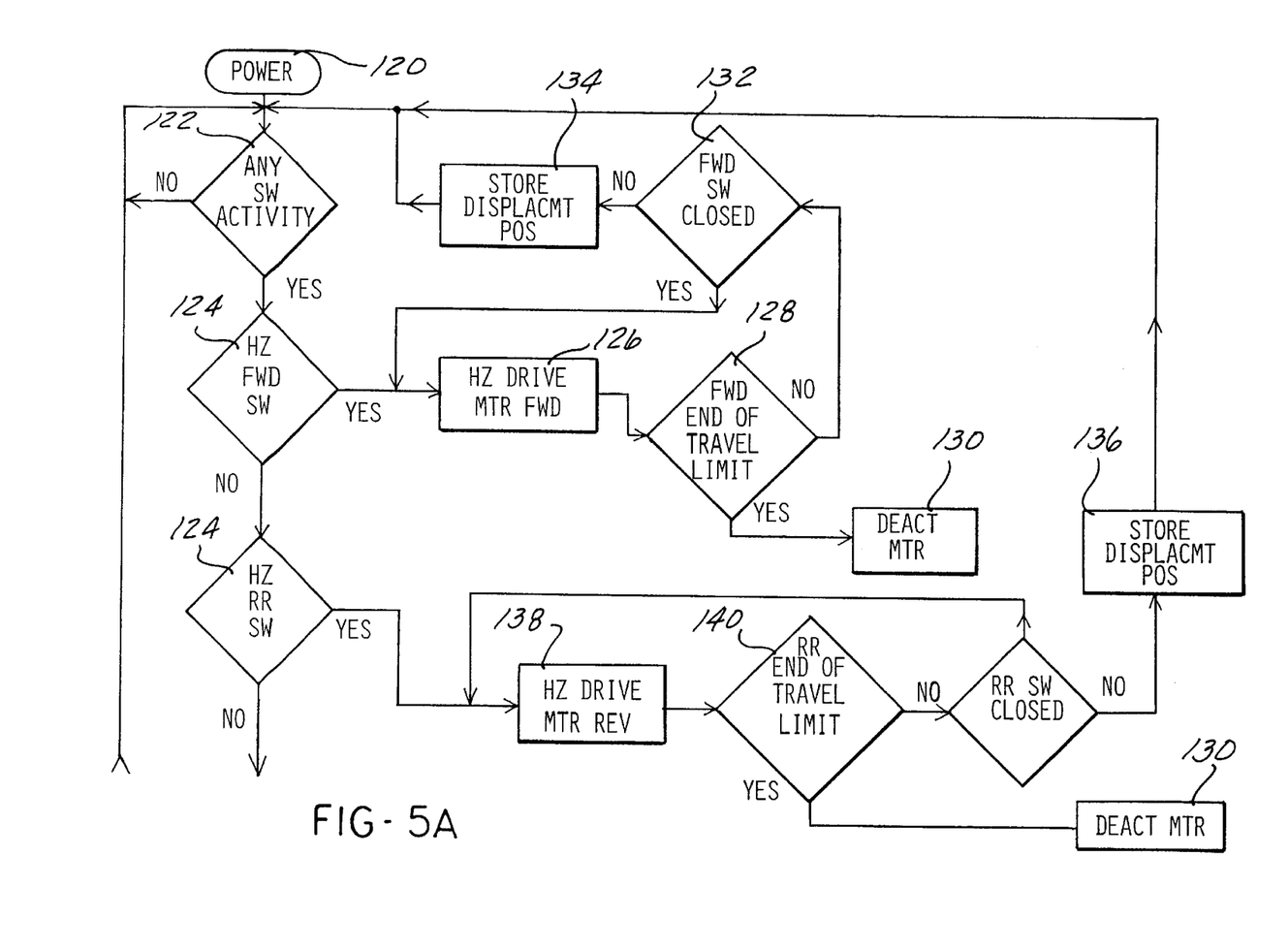
FIGS. 5A and 5B are an exemplary flow diagrams depicting the sequence of operation of the controller of the seat memory control apparatus of the present invention.
Figure 5B:
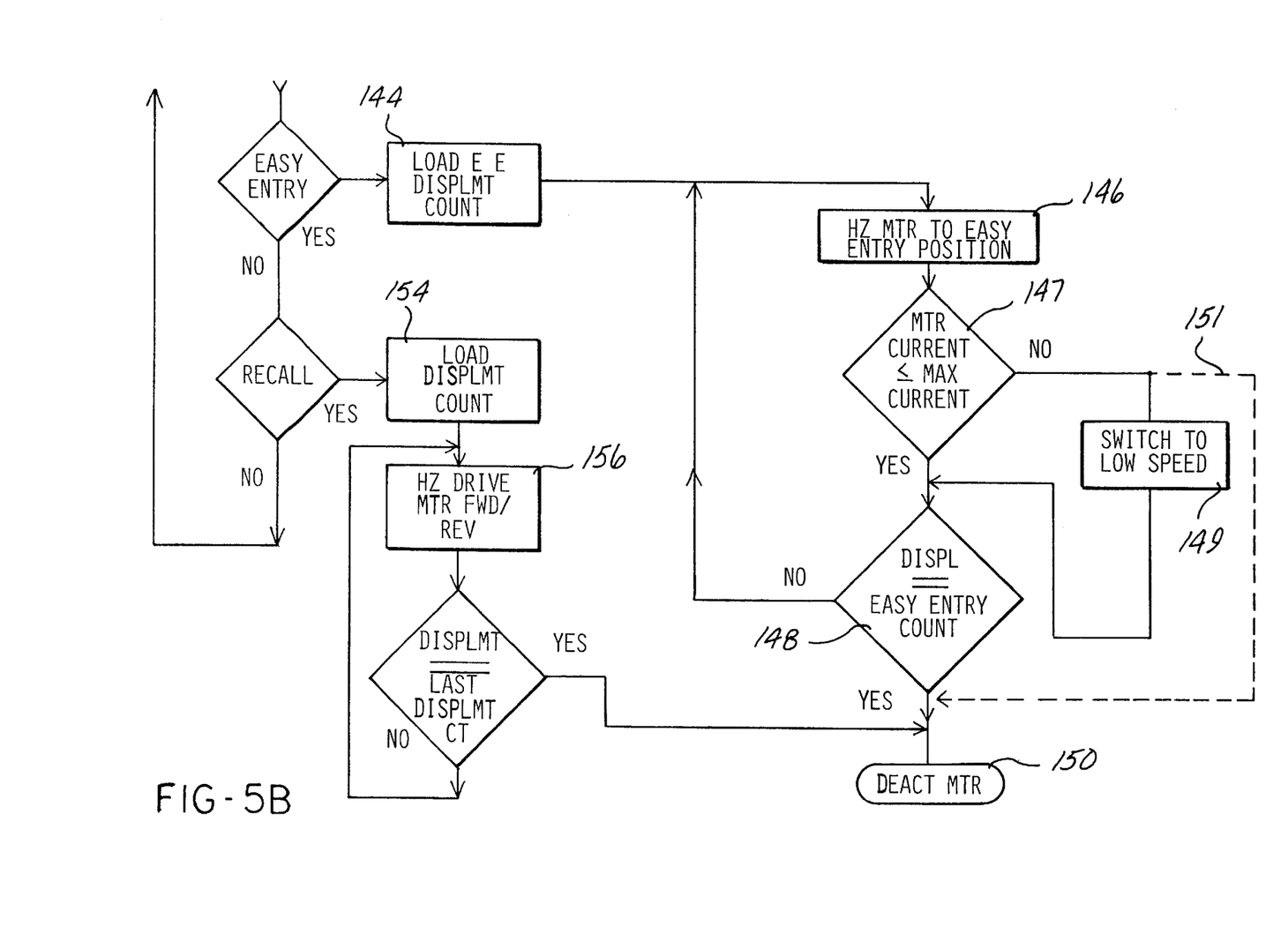

FIGS. 5A and 5B depict an exemplary flow diagram depicting the sequence of operation of the controller 64 in executing the control program stored in the memory 66 to control user selected and automatic repositioning of the horizontal drive mechanism of the power seat adjuster 10. The flow diagram shown in FIG. 4 depicts only the sequence of operation of the horizontal fore and aft drive motor 34. It will be understood that similar commands and a identical sequence will also be stored in the control program executed by the specific controllers 64 for the vertical drive motors 22 and 24 and the seat back recliner drive motor 26 if employed in the "easy entry" sequence.

Upon the application of power in step 120, such as through the switching of the vehicle ignition switch to the "on" or "accessory" position, the controller 64 checks for any switch activity in step 122. Assuming that the horizontal control switch 68 has been manually switched by the user to a forward or reverse position, the controller 64 detects which switch position has been selected in steps 122 and 124.

Upon detecting a user select input, such as movement of the switch 68 to the forward drive position 69 in step 124, the controller 64 sends a control signal to the driver 84 which supplies current to the winding 60 to cause the output shaft of the motor 34 to rotate in a direction to drive the horizontal drive mechanism in a forward direction as indicated in step 126.

Although a constant current can be supplied to the driver 84, it is preferred that a varying current be supplied by the controller 64 to smoothly and gradually accelerate the seat to a maximum velocity then smoothly decelerate the seat to a stop as the seat approaches the easy entry position the last displacement position or an end of travel limit in a harmonic type profile. The varying current profile can be prestored in the memory 66.

The controller 64 in step 128 checks to see if the horizontal drive mechanism has reached the forward end of travel limit in step 128. If the current count of pulses from the sensor 86 equals the prestored forward end of travel limit count, the controller 64 immediately stops the flow of current to the winding 60 in step 130 to deactivate the motor 34. If the forward end of travel limit has not been reached in step 128, the controller 64 checks in step 132 to see if the switch 68 is still depressed to the forward drive position 69 and if so, the controller 64 continues to supply an output signal via step 126 to the driver 64 to cause the motor 34 to continue to rotate the output shaft in the forward drive modes until the switch 68 is released. When the switch 68 is released, as determined in step 132, the controller 64, in step 134 stores the last position count of pulses from the sensor 68 in the memory 66 as a last horizontal displacement count. Control then returns to step 122 as described above.

As shown in FIGS. 5A and 5B, the same sequence of steps is provided if the switch 68 is moved to the rearward drive position 70. As described above, the controller 64, when the switch 68 is released from the rearward drive position 70, will store the last position count representative of the last displacement position of the horizontal drive in the memory 66 in step 136. During movement of the horizontal drive in a rearward direction by a reversal of current flow through the winding 60 in step 138, the controller 64 continually compares the current accumulated count of pulses from the sensor 86 with the preset rearward end of travel limit in step 140 and ceases the flow of current to the motor 34 if the rearward end of travel limit is reached.

At any time during the application of power to the power seat adjuster 10, the controller 64, upon detecting a depression of the "easy entry" select means or pushbutton 80 in step 142 will load the "easy entry" displacement count for the horizontal drive motor 34 into a count register in the controller 64 in step 144. The controller 64 then compares the "easy entry" displacement count with the current or last displacement position count of the horizontal drive from steps 134 or 136 and determines the direction of movement of the horizontal drive and supplies an appropriate output signal to the driver 84 to supply current to the "hi" speed winding 62 assuming that the motor 34 has a separate high speed winding, in a direction to move the horizontal drive to the prestored "easy entry" position in step 146. The controller in step 148 continually compares the "easy entry" displacement count with the last displacement position count of the horizontal drive in step 148 and discontinues the supply of current to the motor 34 thereby stopping rotation of the output shaft of the motor 34 in step 150 when the counts are equal.

As shown in FIGS. 5A and 5B, at any time during the application of power to the power seat adjuster 10, the recall select means or pushbutton 82 may be depressed and detected by the controller 64 in step 152. The controller 64, in step 154 then loads the last displacement position count of the horizontal drive from steps 134 or 136 into a count register and supplies a control signal to the driver 84 to control to supply current to the "hi" speed winding 62 causing the output shaft of the motor 34 to rotate in a direction to drive the horizontal drive mechanism to the recall or last displacement position of the horizontal drive mechanism. The controller in step 158 continually prepares the last displacement position count with the current position count of the horizontal drive and will continue to supply a control signal to the driver 84 continuing the flow of current to the hi speed winding 62 until the counts are equal. When the counts are equal, the controller 64 discontinues the supply of current to the motor 34 thereby stopping the motor 34 as shown in step 150.

The magnitude of the current signal supplied by the controller 64 to the motor 34 during "recall" will depend on the predefined "easy entry" position of the seat adjuster. In a two-door vehicle without a useable backseat or in a four-door vehicle, as the user will occupy the seat immediately upon the seat reaching the "easy entry" position, the controller 64 will supply current to the motor 34 during "recall" to activate the motor 34 at a low speed to the last displacement position. In two-door vehicle having a useable backseat wherein the "easy entry" position is predefined as a full forward seat position, the controller 64, upon entering the "recall" mode, will supply current to the motor 34 to rotate the motor output shaft at a high speed to the last displacement position since the seat will not be occupied.

As noted above, similar commands are executed by the specific controllers for the front and rear vertical drive motors 22 and 24 and the seat back recliner drive motor 26. In such a multiple controller, multiple drive motor application, the "easy entry" select button 80 and the "recall" select pushbutton 82 will be connected to each controller for simultaneous operation of all the controllers in easy entry or recall modes of operation.

A motor current sensor 87, shown in FIG. 4, is optionally input to the controller 64 to provide the controller 64 with an indication of the motor current during activation of the motor 34. A prestored maximum current is stored in the memory 66 and compared by the controller 64 with the actual motor current in step 147, FIG. 5B. In this way, the controller 64 can detect one of several different conditions and automatically deactivate the motor or switch the motor to a lower speed.

For example, if an obstruction is encountered during movement of the seat adjuster component by the motor 34, such as when an occupant's knees strike the vehicle dashboard, the motor current will exceed the maximum current and cause the controller 64 to immediately deactivate the motor 34 and stop further movement of the seat adjuster component, as shown by phantom line 151 in FIG. 5B. Alternately, when the controller detects a current higher than the prestored maximum current during "easy entry" movement in step 147, such as could occur if the occupant activated the "easy entry" select switch 80 while seated on the seat, the controller 64 will automatically switch the motor to a lower speed, step 149, to provide the necessary torque for seat movement. This latter sequence prevents movement of the seat adjuster at a high speed in an "easy entry" mode.

The sequence described above enables the controller 64 to control the complete operation of the power seat adjuster 10 to enable the user to manually reposition any seat component, such as the horizontal drive, the front and rear vertical drive, or the seat back recliner position of the seat adjuster at the user's preference and control. At the same time, the controller 64 can also automatically move each of the seat components to a predefined "easy entry" position to enable easy ingress and egress to and from the seat. At the same time, the controller 64 repositions the seat to the last user selected position prior to movement to the "easy entry" position. In one embodiment, the separate high speed rotation of the horizontal drive motor as well as similar high speed rotation of each of the vertical front and rear drive motors 22 and 24 and the seat recliner drive motor 26 enable the controller 64 to move all of the seat components to the "easy entry" position at a high speed to permit quick passenger ingress and egress to and from the seat.

What is claimed is:

1. A vehicle seat control apparatus comprising:
   a motor having first and second ends operative to position a first seat component relative to a second seat component, the motor having a movable output member extending from the first end;
   means, connected to the motor, for generating a first seat component displacement signal indicative of the position of the first seat component relative to the second seat component;
   memory means for storing a first seat component recall displacement signal and a preset easy entry displacement position of the first seat component;
   easy entry select means for selecting the easy entry displacement position of the first seat component;
   recall select means for selecting the recall displacement signal of the first seat component;
   control means, connected to the memory and responsive to the easy entry select means and the recall select means, for respectively repositioning the first seat component to the preset easy entry position and to the recall displacement position upon respective activation of the easy entry select means and the recall select means; and
   a housing carried on the second end of the motor, the control means and the memory means mounted in the housing.

2. The vehicle seat control apparatus of claim 1 wherein the control means further comprises:
   means for generating at least first and second speeds of movement of the motor output member, the first speed being faster than the second speed;
   the control means activating the means for generating the first speed of movement of the motor output member in response to activation of the easy entry select means; and
   the control means activating the means for generating the second speed of movement of the motor output member in response to activation of the recall select means.

3. The vehicle seat control apparatus of claim 1 further comprising:
    preset first and second end limits of travel of the first seat component relative to the second seat component, the first and second end limits of travel being stored in the memory means; and
    the control means, responsive to the first and second end limits of travel and the displacement signal, for deactivating the motor when the displacement signal equals one of the preset first and second end limits of travel.

4. The vehicle seat control apparatus of claim 1 wherein:
    the motor output member is a bidirectionally rotatable output shaft.

5. The vehicle seat control apparatus of claim 1 further comprising:
    a plurality of motors, each operative to position a different one portion of the vehicle seat relative to a different second portion of the vehicle seat, each of the plurality of motors having a movable output member;
    a plurality of means, one connected to each of the plurality of motors, for generating seat positional displacement signals indicative of the position of the different one portion of the seat relative to the different second portion of the seat;
    the memory means storing seat positional recall displacement signals and preset easy entry position signals for each of the motors.

6. The vehicle seat control apparatus of claim 5 further comprising:
    first and second end limits of travel stored in the memory means for each different portion of the seat.

7. A vehicle seat control apparatus comprising:
    a motor operative to position a first seat component relative to a second seat component, the motor having a movable output member;
    means, connected to the motor, for generating a first seat component displacement signal indicative of the position of the first seat component relative to the second seat component;
    memory means for storing a first seat component recall displacement position and a preset easy entry displacement position of the first seat component;
    means for storing a maximum motor current in the memory means;
    motor current sensor means for providing an output signal indicating actual motor current during activation of the motor;
    easy entry select means for selecting the preset easy entry displacement position of the first seat component;
    recall select means for selecting the recall displacement position of the first seat component; and
    control means, connected to the memory means and responsive to the easy entry select means and the recall select means, for respectively repositioning the first seat component to a preset easy entry position and to the recall displacement position upon respective activation of the easy entry select means and the recall select means, the control means further including:
    means for generating at least first and second speeds of movement of the motor output member, the first speed being faster than the second speed;
    the control means activating the means for generating the first speed of movement of the motor output member in response to activation of the easy entry select means, and
    the control means comparing the stored maximum motor current with the output signal of the motor current sensor means and changing operation of the motor to the second speed when the actual motor current exceeds the stored maximum current after activation of the easy entry select means.

8. A method for controlling vehicle seat positioning comprising the steps of:
    providing a motor operative to position a first seat component relative to a second seat component, the motor having a movable output member;
    generating a first seat component displacement signal indicative of the displacement position of the first seat component relative to the second seat component;
    storing first seat component recall displacement position and a preset easy entry displacement position of the first seat component in a memory;
    providing easy entry select means for selecting the easy entry displacement position of the first seat component;
    providing recall select means for selecting the recall displacement position of the first seat component;
    generating at least first and second speeds of movement of the motor output member, the first speed being faster than the second speed;
    activating the motor at the first speed of movement of the motor output member in response to activation of the easy entry select means;
    repositioning the first seat component to the easy entry position and to the recall displacement position upon respective activation of the easy entry select means and the recall select means;
    prestoring a maximum motor current value in the memory;
    measuring the actual motor current during activation of the motor; and
    whenever the actual motor current exceeds the stored maximum motor current value, automatically switching the speed of movement of the motor output member to the second speed after activation of the easy entry select means.

9. The method of claim 8 further comprising the steps of:
    storing preset first and second end limits of travel of the first seat component relative to the second seat component in the memory means; and
    deactivating the motor when the displacement signal equals one of the preset first and second end limits of travel.

10. The method of claim 8 further comprising the steps of:
    forming the first and second seat components as an upper track and a lower track of a vehicle power seat adjuster, respectively, the upper track being slidably movable relative to the lower track;
    defining the preset easy entry displacement position of the upper track as being a full forward displaced position relative to the lower track;
    activating the motor output member at the first speed to move the upper track to the preset easy entry displacement position.

11. The method of claim 10 further comprising the step of:
    activating the motor output member at the first speed to move the upper track from the preset easy entry displacement position to the recall displacement position of the upper track in response to activation of the recall select means.

12. The method of claim 8 further comprising the steps of:

forming the first and second seat components as an upper track and a lower track of a vehicle power seat adjuster, respectively, the upper track being slidably movable relative to the lower track;

defining the preset easy entry displacement position of the upper track as being a full rearward position of the upper track relative to the lower track; and activating the motor output member to move the upper track to the easy entry displacement position at the first speed in response to the easy entry select means.

13. The method of claim 12 further comprising the step of:

activating the motor output member at the second speed to move the upper track from the easy entry displacement position to the recall displacement position at the second speed in response to activation of the recall select means.

* * * * *